(12) United States Patent
Kakuta et al.

(10) Patent No.: US 6,969,988 B2
(45) Date of Patent: Nov. 29, 2005

(54) ANGLE DETERMINING APPARATUS AND ANGLE DETERMINING SYSTEM

(75) Inventors: Katsumi Kakuta, Shizuoka (JP); Christian Schott, Lussy-sur-Morges (CH)

(73) Assignees: Asahi Kasei EMD Corporation, Tokyo (JP); Sentron AG, Zug (CH)

( * ) Notice: Subject to any disclaimer, the term of this patent is extended or adjusted under 35 U.S.C. 154(b) by 0 days.

(21) Appl. No.: 10/508,847

(22) PCT Filed: Mar. 20, 2003

(86) PCT No.: PCT/JP03/03457

§ 371 (c)(1),
(2), (4) Date: Sep. 22, 2004

(87) PCT Pub. No.: WO03/081182

PCT Pub. Date: Oct. 2, 2003

(65) Prior Publication Data

US 2005/0127899 A1 Jun. 16, 2005

(30) Foreign Application Priority Data

Mar. 22, 2002 (JP) ........................................ 2002-081955

(51) Int. Cl.[7] ................................................. G01B 7/30
(52) U.S. Cl. ............................... 324/207.25; 324/207.2
(58) Field of Search ............ 324/207.13, 207.2–207.25, 324/244, 251, 260; 73/514.16, 514.31; 123/612, 617

(56) References Cited

U.S. PATENT DOCUMENTS 5,942,895 A    8/1999 Popovic et al.
6,184,679 B1   2/2001 Popovic et al.
6,545,462 B2   4/2003 Schott et al.
6,731,108 B2   5/2004 Zalunardo et al.

FOREIGN PATENT DOCUMENTS

| EP | 0 871 011 A2 | 10/1998 |
| JP | 7190800 | 7/1995 |
| JP | 200329513 | 11/2000 |
| JP | 2002054902 | 2/2002 |

OTHER PUBLICATIONS

Alberto Bilotti, Gerardo Monreal, and Ravi Vig, "Monolithic Magnetic Hall Sensor Using Dynamic Quadrature Offset Cancellation", published by Allegro MicroSystems, Inc., Technical Paper STP 97–10.

*Primary Examiner*—Bot LeDynh
(74) *Attorney, Agent, or Firm*—McCormick, Paulding & Huber LLP

(57) ABSTRACT

An angle detection apparatus for detecting an angle of a rotatable magnetic field source comprises first and second magnetic sensor units for detecting first and second magnetic components of the magnetic field of the magnetic field source, driving means for driving the first and second magnetic sensor unit and control means. The control means control an output signal of the first magnetic sensor unit so as to have a fixed value and the driving means drive the second magnetic sensor unit according to the same drive conditions as those applied to the first magnetic sensor unit at the time when the first magnetic sensor unit is controlled by said control means so that an output signal of the second magnetic sensor unit is proportional to the tangent of said angle.

12 Claims, 15 Drawing Sheets

DETECTION THEORY FOR TANGENT VALUE

There are two components (a+d) and (a-d)
If Y(a+d) + Y(a-d) is controlled to be constant, For Y component Vref = K I B[cos(a+d) + cos(a-d)]
Vref = 2KI Bcos(a) cos(d)
IB=Vref/cos(a)cos(d)2K For X component Out=X(a+d) + X(a-d) = K I B {sin(a+d) + sin(a-d)}
= 2K I B sin(a) cos(d)
= Vref tan(a)

ANGLE AREA JUDGMENT AFTER POWER-ON

ANGLE DETERMINING APPARATUS AND ANGLE DETERMINING SYSTEM

TECHNICAL FIELD

The present invention relates to an angle detection apparatus and an angle detection system.

More specifically, the present invention relates to an angle detection apparatus that detects a relative angle with respect to a magnetic field on the basis of an output signal from a magnetic sensor unit, which detects magnetic components in at least two directions, and an angle detection system including this angle detection function.

BACKGROUND ART

Conventionally, various angle detection apparatuses using magnetic sensors such as Hall elements have been known. It is widely known that, in these conventional angle detection apparatuses, an offset error included in a Hall element output is cancelled by adopting a constitution based on a so-called spinning current method. This spinning current method is described in, for example, Alberto Bilotti, Gerardo Monreal, and Ravi Vig, "MONOLITHIC MAGNETIC HALL SENSOR USING DYNAMIC QUADRATURE OFFSET CANCELLATION", published by Allegro MicroSystems, Inc., Technical Paper STP 97-10.

In addition, as described in U.S. Pat. No. 5,942,895, it is known that accurate magnetic detection is performed by arranging Hall elements under a magnetic flux concentrator.

However, when angle detection for a magnetic field is performed according to these conventional techniques, since it is necessary to, for example, apply predefined digital processing to each Hall output to finally perform arithmetic processing for obtaining angle information, enlargement of a circuit size and an increase in production cost are inevitable problems.

In particular, when attempting to realize a very small angle detection apparatus by a semiconductor process or the like, simplification of a circuit configuration and reduction in size of an entire apparatus are problems that must be solved by any means.

Thus, in view of the above-described points, it is an object of the present invention to provide an angle detection apparatus and an angle detection system that allows for accurate angle detection, regardless of a simplified circuit configuration.

DISCLOSURE OF THE INVENTION

In order to attain the above-described object, the invention according to claim 1 is an angle detection apparatus that is inputted with output signals from first and second magnetic sensor units for detecting magnetic components in at least two directions, and detects a relative angle with respect to a magnetic field from the magnetic components, the angle detection apparatus comprising: control means for controlling an output signal in a first direction component detected by the first magnetic sensor unit so as to have a fixed value; and driving means for driving the second magnetic sensor unit to detect an output signal in a second direction component according to the same drive conditions as those at the time when the first magnetic sensor unit is controlled by the control means.

The invention according to claim 2 is an angle detection apparatus that includes first and second magnetic sensor units for detecting magnetic components in at least two directions, and detects a relative angle with respect to a magnetic field from the magnetic components, the angle detection apparatus comprising: control means for controlling an output signal in a first direction component detected by the first magnetic sensor unit so as to have a fixed value; and driving means for driving the second magnetic sensor unit to detect an output signal in a second direction component according to the same drive conditions as those at the time when the first magnetic sensor unit is controlled by the control means.

The invention according to claim 3 is the angle detection apparatus according to claim 1 or 2, wherein the first magnetic sensor unit and the second magnetic sensor unit include an opposed pair of magnetic sensors, respectively, and these pair of magnetic sensors are arranged on straight lines perpendicular to each other.

The invention according to claim 4 is the angle detection apparatus according to any one of claims 1 to 3, wherein the first magnetic sensor unit and the second magnetic sensor unit are arranged near an end of a magnetic flux concentrator.

The invention according to claim 5 is the angle detection apparatus according to any one of claims 1 to 4, wherein the control means includes a feedback control loop for controlling the output signal in the first direction component so as to have the fixed value.

The invention according to claim 6 is the angle detection apparatus according to claim 5, wherein the control means includes feedback stop means for disconnecting the feedback control loop.

The invention according to claim 7 is the angle detection apparatus according to claim 5 or 6, wherein the feedback control loop includes an operational amplifier, one of the output signal in the first direction component and the output signal in the second direction component is inputted to an inverted input terminal of the operational amplifier via a resistor, and a reference input voltage is inputted to the inverted input terminal of the operational amplifier via a resistor.

The invention according to claim 8 is the angle detection apparatus according to claim 7, where the decision wether the output signal from the first direction component or the output signal from the second direction component, which is inputted to the inverted input terminal of the operational amplifier, is given by an additional unit, the designation unit.

The invention according to claim 9 is the angle detection apparatus according to claim 7 or 8, wherein a PI regulator is connected between an output terminal and the inverted input terminal of the operational amplifier.

The invention according to claim 10 is the angle detection unit according to any one of claims 6 to 9, wherein the feedback stop means drives the first and the second magnetic sensor units at a predefined constant voltage.

The invention according to claim 11 is the angle detection apparatus according to any one of claims 7 to 10, wherein the feedback stop means causes the operational amplifier to operate as a voltage follower.

The invention according to claim 12 is the angle detection apparatus according to any one of claims 7 to 11, wherein the first and the second magnetic sensor units are driven on the basis of a voltage obtained from the output terminal of the operational amplifier.

The invention according to claim 13 is the angle detection apparatus according to any one of claims 1 to 12, wherein the first and the second magnetic sensor units are driven in accordance with a spinning current method.

The invention according to claim 14 is the angle detection apparatus according to any one of claims 6 to 13, further including an area judging means for, immediately after a power supply of the angle detection apparatus is inputted, performing judgment of an angle area on the basis of detection outputs from the first and the second magnetic sensors for detecting magnetic components in at least two directions, while retaining a state in which the function of the feedback control loop is stopped by the feedback stop means.

The invention according to claim 15 is the angle detection apparatus according to claim 14, wherein, in performing the judgment of an angle area, the area judging means uses absolute values and positive and negative signs of the output signals in the first and the second direction components obtained from the first and the second magnetic sensor units.

The invention according to claim 16 is the angle detection apparatus according to any one of claims 1 to 15, further comprising: sign reversing means for reversing the signs of the output signals in the first and the second direction components, which are detected on the basis of the outputs from the first and the second magnetic sensor units, respectively, according to the magnetic field and the relative angle; and component switching means for switching the output signal in the first direction component, which should be controlled so as to have the fixed value, to the output signal in the second direction component, the angle detection apparatus expanding a detectable range of angles.

The invention according to claim 17 is the angle detection apparatus according to claim 16, wherein, after switching the output signal in the first direction component to the output signal in the second direction component, the component switching means switches the output signal in the second direction component to the output signal in the first direction component again.

The invention according to claim 18 is the angle detection apparatus according to any one of claims 1 to 17, further comprising: counting means for performing a counting operation for a predetermined clock in response to the output signal in the first direction component detected by the first magnetic sensor unit or the output signal in the second direction component detected by the second magnetic sensor unit; first transforming means for transforming a counted value of the counting means into a predetermined transformation value; a counting stop means for comparing a value of the output signal in the first or the second direction component with the transformation value and stopping the counting operation by the counting means when the transformation value has reached the value of the output signal in the first or the second direction component; and second transforming means for transforming the counted value into angle information.

The invention according to claim 19 is the angle detection apparatus according to claim 18, wherein the counted value corresponds to a detection angle θ and the transformation value corresponds to tan θ.

The invention according to claim 20 is the angle detection apparatus according to claim 18 or 19, wherein the first transforming means has a logic circuit for transforming the detection angle θ into tan θ.

The invention according to claim 21 is the angle detection apparatus according to any one of claims 18 to 20, wherein the counting stop means is a comparator that has a first input terminal, to which a tangent value detected on the basis of an output from the first magnetic sensor or the second magnetic sensor is inputted, and a second input terminal, to which a tangent value corresponding to an output from the first transforming means is inputted.

The invention according to claim 22 is the angle detection apparatus according to any one of claims 18 to 21, wherein an output terminal of the first transforming means and an input terminal of the counting stop means are connected via a D/A converter.

The invention according to claim 23 is the angle detection apparatus according to claim 22, wherein the angle detection apparatus uses, as a reference voltage for the D/A converter, an output signal in a direction component, which is controlled so as to have the fixed value, of the first and the second output signals that are detected on the basis of outputs from the first and the second magnetic sensor units.

The invention according to claim 24 is the angle detection apparatus according to any one of claims 18 to 23, wherein the second transforming means performs predetermined interpolation processing for obtaining the angle information.

The invention according to claim 25 is the angle detection apparatus according to any one of claims 18 to 24, further comprising:

offset correcting means that is inputted with the output signals of the first and the second direction components, which are detected on the basis of the output from the first magnetic sensor unit or the second magnetic sensor unit, and applies addition processing for an offset angle value to the angle information outputted from the second transforming means.

The invention according to claim 26 is the angle detection apparatus according to any one of claims 1 to 25, further comprising judging means for dividing a signal depending upon an angle into plural angle areas, which change linearly with respect to the angle, the angle detection apparatus performing extraction of an angle according to adjustment of an inclination of an approximate straight line and linear transformation by offset addition.

The invention according to claim 27 is the angle detection apparatus according to any one of claims 1 to 26, wherein the first and the second magnetic sensor units have Hall elements.

The invention according to claim 28 is the angle detection apparatus according to claim 22, wherein the Hall elements are arranged near an end of a magnetic flux concentrator.

The invention according to claim 29 is an angle detection system wherein a semiconductor device with the angle detection apparatus according to any one of claims 1 to 28 formed on a semiconductor substrate is set near a rotating permanent magnet to detect a rotation angle of the permanent magnet.

BRIEF DESCRIPTION OF THE DRAWINGS

FIG. 10 is a diagram showing a switch SW when feedback control cancellation is performed in the case in which angle area detection is performed after power-on;

BEST MODE FOR CARRYING OUT THE INVENTION

Figure 1:
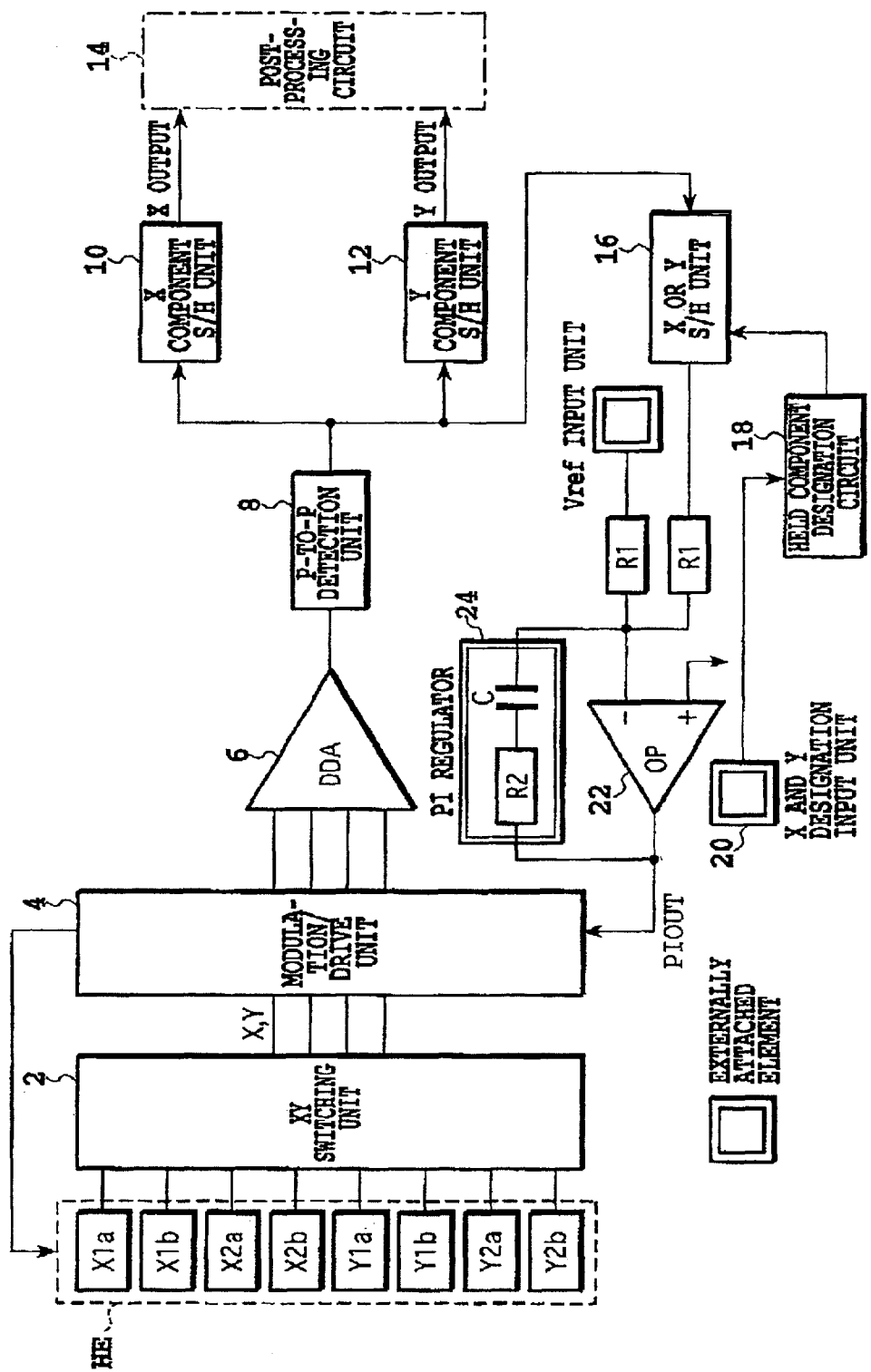
FIG. 1 is a circuit diagram showing a main part of an angle detection apparatus to which the present invention is applied.

FIG. 1 is a circuit diagram showing a main part of an angle detection apparatus to which the present invention is applied. In the figure, reference sign HE denotes Hall elements, which are used as magnetic sensors. At least two pairs of Hall elements are necessary in order to detect an X direction component and a Y direction component of a magnetic field. In this embodiment, four Hall elements are provided in order to detect the X direction component and four Hall elements are provided in order to detect the Y direction component.

Figure 2:
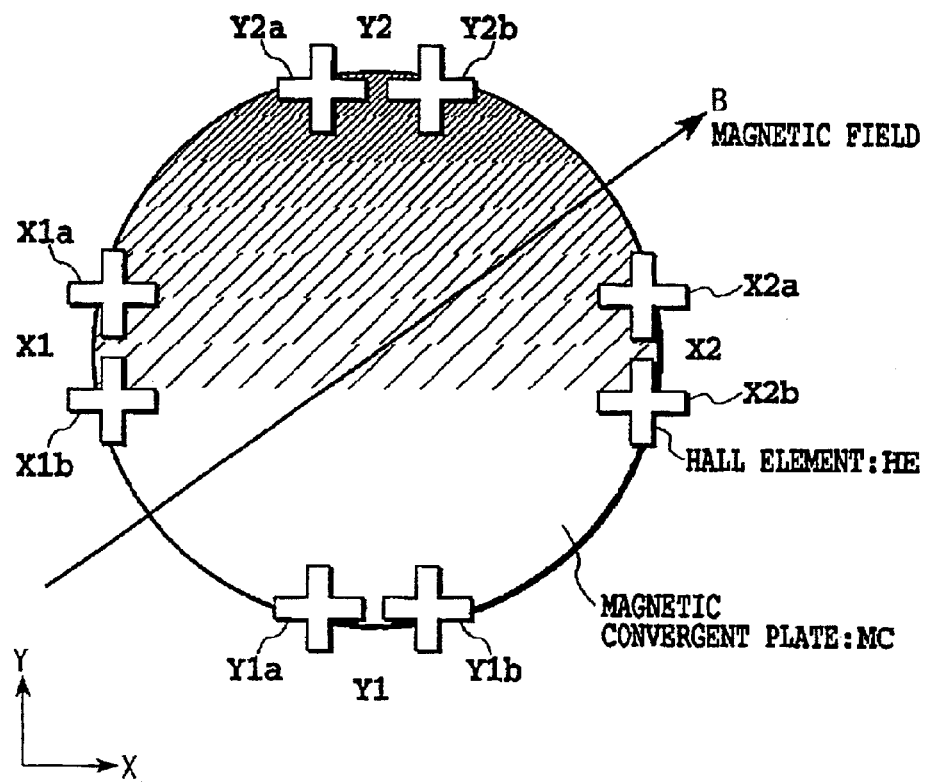
FIG. 2 is an explanatory diagram showing a positional relation between a magnetic flux concentrator and Hall elements used in an embodiment.

As shown in FIG. 2, these Hall elements HE are arranged below a peripheral edge of a circular magnetic flux concentrator MC. Note that, as also described in U.S. Pat. No. 5,942,895, a magnetic field near the Hall elements is converged, whereby a magnetic flux density of magneto-sensitive surfaces of the Hall elements can be increased.

"Control means" in accordance with the present invention is equivalent to an operational amplifier 22, a PI regulator 24, two resistors R1, and a reference voltage Vref that are shown in FIG. 1 (these components will be described in detail later). In addition, "driving means" of the present invention is equivalent to a modulation/drive unit 4 and the operational amplifier 22 that are shown in FIG. 1 (this modulation/drive unit 4 will also be described in detail later).

Referring back to FIG. 1, output switching processing for the Hall elements will be explained.

Detected signals, which are detected from the eight Hall elements HE, respectively, are sequentially selected in a time division manner in an XY switching unit 2. In other words, in this XY switching unit 2, output signals from the respective pairs of Hall elements are sampled while being switched alternately. In general, it is sufficient to provide amplifiers and demodulation circuits (P-to-P detection units) for a detected signal X and a detected signal Y, respectively. However, this results in an increase in chip area. Thus, this embodiment adopts a constitution in which the detected signals X and Y are sampled alternately, and an amplifier and a demodulation circuit (P-to-P detection unit) common to these detected signals X and Y are used.

Figure 3:
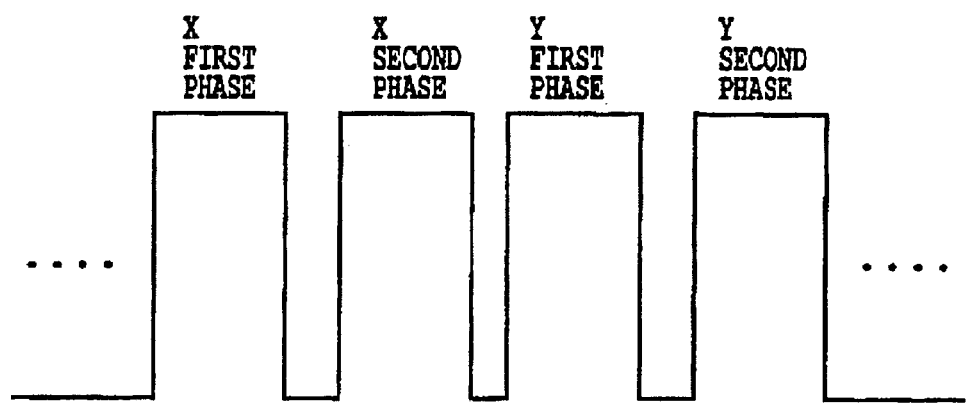
FIG. 3 is a waveform chart for explaining an operation of an XY switching unit 2 shown in FIG. 1.

More specifically, Hall elements for obtaining the detected signal X and Hall elements for obtaining the detected signal Y are switched alternately and driven. Thus, as shown in FIG. 3, the XY switching unit 2 uses a clock for a first phase and a clock for a second phase to perform selection of Hall elements. For example, the XY switching unit 2 is constituted by a switched capacitor circuit and uses the clock for a first phase and the clock for a second phase as sampling clocks for the switched capacitor circuit. These clocks of two phases are used in order to cancel offset DC components superimposed on detected signals of Hall elements. Details of this will be explained in relation to the modulation/drive unit 4 in the next stage.

Figures 4A, 4B:
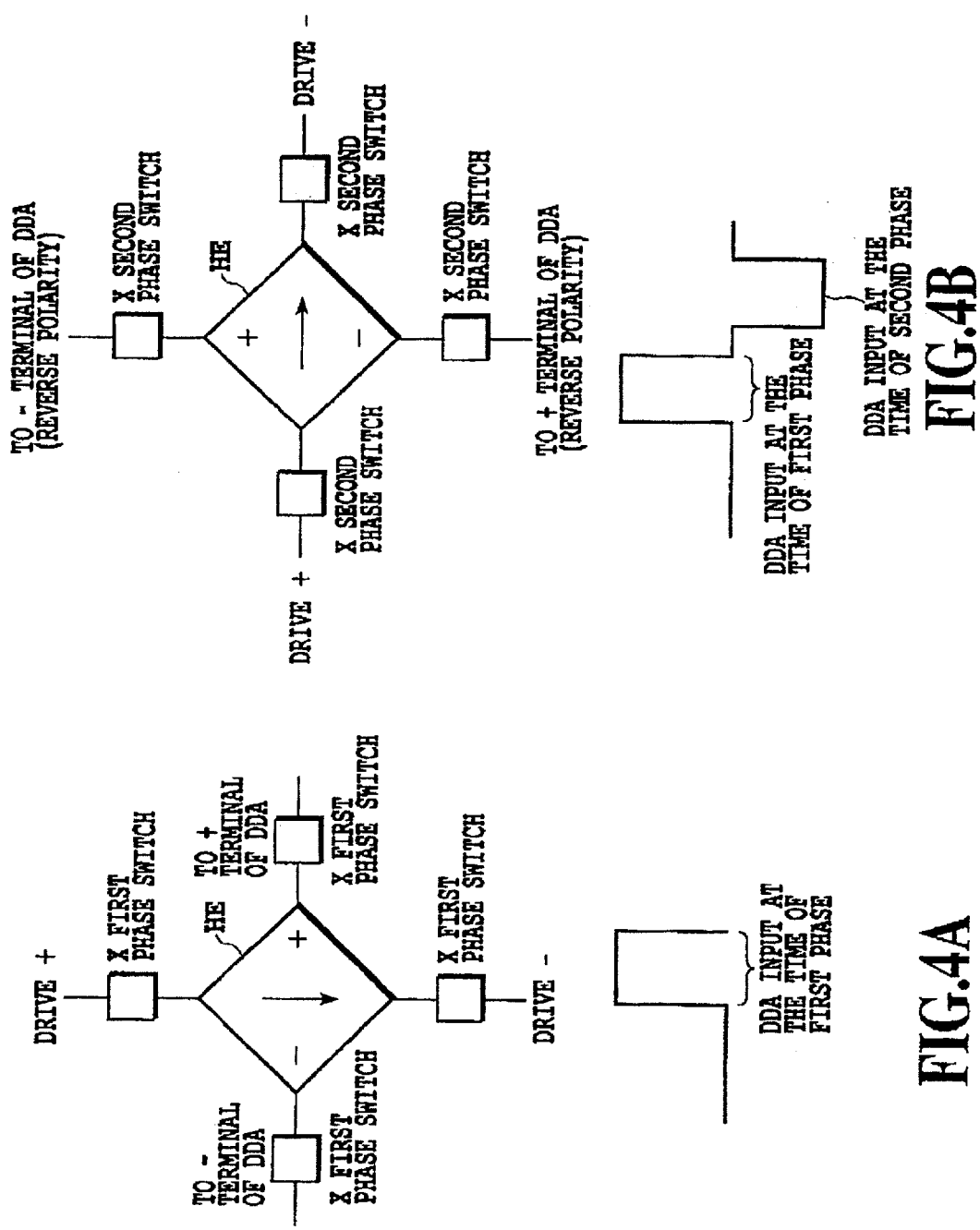
FIG. 4A is an explanatory diagram showing an operation of a modulation/drive unit 4 shown in FIG. 1.
FIG. 4B is an explanatory diagram showing an operation of the modulation/drive unit 4 shown in FIG. 1.

The modulation/drive unit 4 performs bias direction switching processing for obtaining the detected signal X and the detected signal Y and processing for switching an extracting direction of a signal (Hall voltage). This processing is a method that is generally known as a so-called chopper method or spinning current method. FIGS. 4A and 4B illustrate a mode of driving a Hall element in two phases using this spinning current method. As shown in FIGS. 4A and 4B, the spinning current method switches a bias direction of the Hall element HE to thereby cancel an offset component included in an output signal of the Hall element.

It should be noted here that, in the first phase and the second phase shown in FIG. 3, a polarity of a signal to be inputted to a four-input addition type amplifier 6 (DDA: Differential Difference Amplifier) in a subsequent stage is reversed. According to this sign-reversing processing, a detected signal of the Hall element HE viewed from the DDA 6 side changes to a rectangular wave that alternates like AC. In other words, a Hall voltage inputted as a DC component is modulated (i.e., transformed) into an AC signal by this sign-reversing processing. This signal processing is performed completely in the same manner for both the detected signal X and the detected signal Y.

Figure 5:
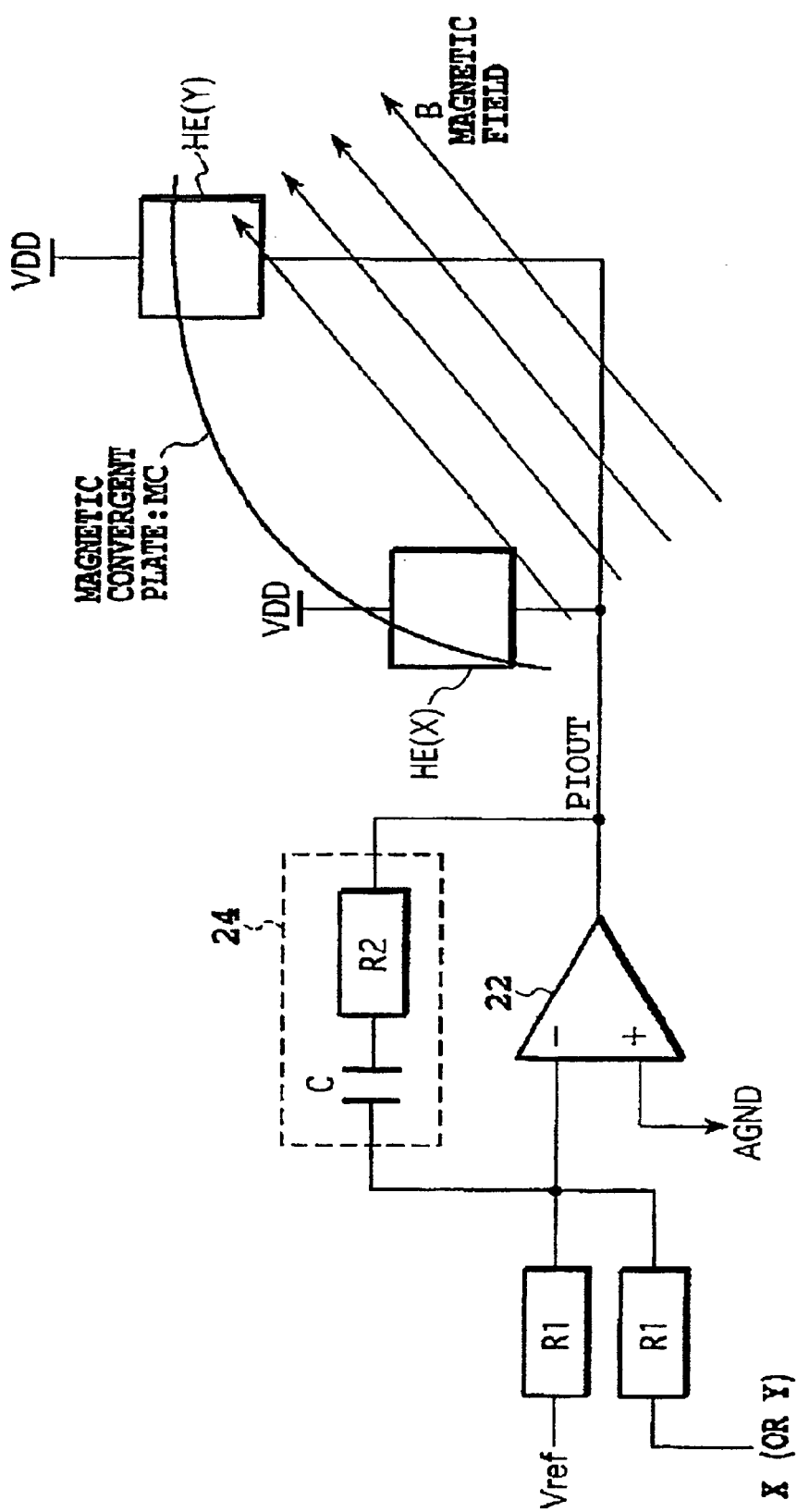
FIG. 5 is an explanatory diagram schematically illustrating how to drive Hall elements for obtaining an X detected signal and Hall elements for obtaining a Y detected signal via the modulation/drive unit 4 shown in FIG. 1.

FIG. 5 is an explanatory diagram schematically illustrating how to drive Hall elements for obtaining an X detected signal and Hall elements for obtaining a Y detected signal via the modulation/drive unit 4. As is clearly seen from this figure, since a reference voltage $V_{ref}$ and an X component (or a Y component) are applied to an addition input point (inverted input terminal) of an operational amplifier (hereinafter called "an OP amplifier"), the operational amplifier operates such that $V_{ref}+X$ (or $V_{ref}+Y$) is equal to a potential of a virtual ground point (non-inverted input terminal) (analog ground). In addition, as it is evident from FIG. 1, since this X component (or Y component) is a fed back voltage, the X component (or Y component) is subjected to feedback control so as to be a fixed value. Moreover, in this embodiment, a Hall element drive voltage for obtaining one of the components (X component or Y component) subjected to feedback control is applied to the Hall elements for obtaining the other component (Y component or X component) not subjected to feedback control (Hall elements for Y component detection or Hall elements for X component detection). This point is extremely important for this embodiment. A significance of this point will be described in detail later.

Figure 6:
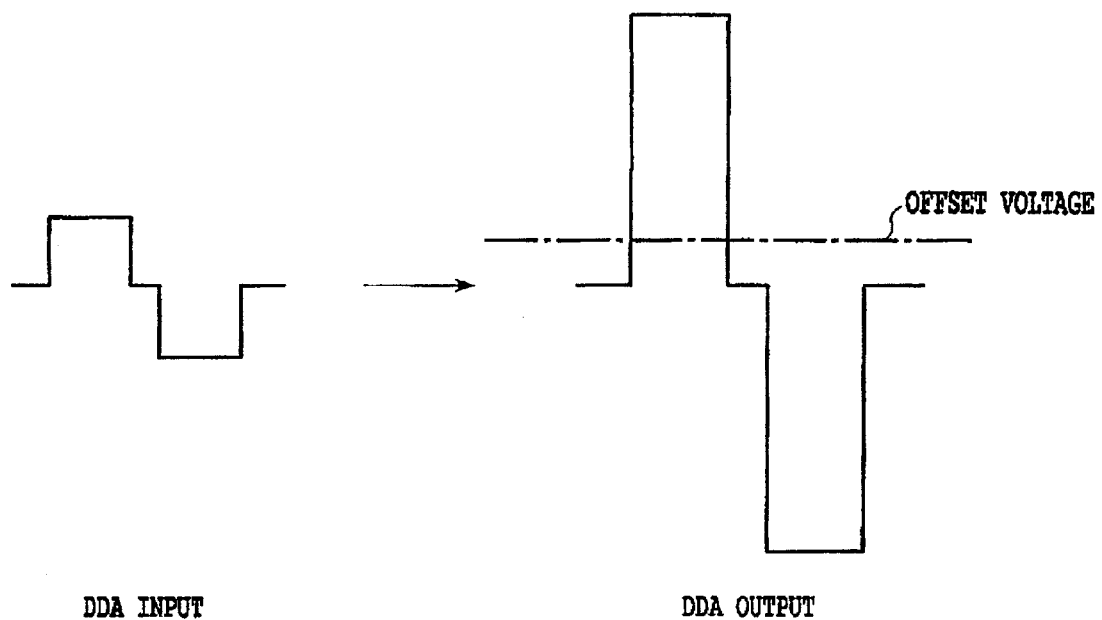
FIG. 6 is a diagram schematically showing an offset voltage superimposed on a detected signal of a Hall element.

Referring back to FIG. 1 again, the DDA (Differential Difference Amplifier) 6 will be explained. This DDA 6 functions to add and amplify inputted voltages. In this embodiment, as described already (see FIG. 2), since there are four Hall elements for an X component and a Y component, respectively, detected outputs of those four Hall elements are added and amplified at a predefined amplification factor. Therefore, a signal outputted from the DDA 6 is a signal obtained by amplifying a waveform at the input end time of the second phase shown in the lower part of FIG. 4B at a set amplification factor X 4. In this case, an offset voltage component superimposed on a detected signal of each Hall element has the same value for both phases (i.e., the first phase and the second phase). FIG. 6 schematically shows this offset voltage, which is indicated by an alternate long and short dash line in the figure.

The P-to-P (peak-to-peak) detection unit 8 is a circuit that detects a peak value of the first phase signal and a peak value of the second phase signal and calculates a value between those peak values. In other words, the P-to-P detection unit 8 performs subtraction to calculate a difference between a peak value of a signal in the first phase and a peak value of a signal in the second phase to thereby demodulate a sensor detection signal (i.e., an output signal of the modulation/drive unit 4) modulated (transformed) into an AC signal. More specifically, the signal of the first phase is held in a capacitor (not shown) of the P-to-P detection unit 8 and is subjected to the subtraction simultaneously with input of the signal of the second phase. What is important here is that, by executing subtraction processing, offset components having the same value can be cancelled. In addition, by performing subtraction, an amplitude component is amplified by two times.

Figure 7:
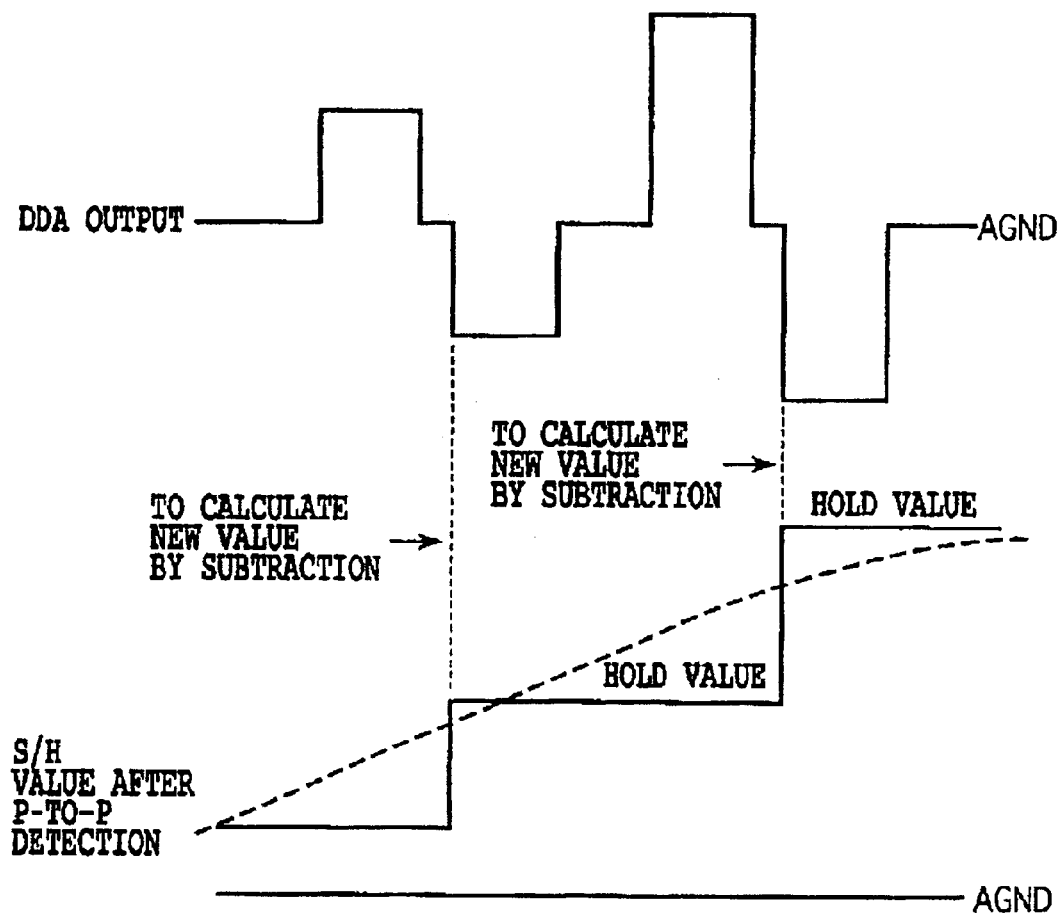
FIG. 7 is an explanatory diagram showing a sample/hold signal after P-to-P (peak-to-peak) detection.

A signal outputted from the P-to-P detection unit 8 is taken into sample and hold (S/H) units 10 and 12 and held therein. Here, the S/H unit 10 holds a demodulated X component and the S/H unit 12 holds a demodulated Y component. As shown in FIG. 7, since a signal subjected to sample and hold takes a stepped shape, by subjecting the signal to smoothing processing using a filter (not shown) included in a post-processing circuit 14, a gentle waveform indicated by a broken line is obtained. Note that, since the P-to-P detection unit 8 is capable of outputting both a non-inverted signal and an inverted signal, it is possible to switch a sign of a signal to be taken into the S/H units 10 and 12 according to a sign bit.

The X component and the Y component outputted from the P-to-P detection unit 8 in a time series manner are inputted to another S/H unit 16. This S/H unit 16 holds only one of the X component and the Y component according to a control output from a held component designation circuit 18. In other words, a held component designation signal is inputted to an X and Y designation input unit 20 from the outside, whereby the held component designation circuit 18 supplies a control output for holding one of the X component and the Y component.

As explained with reference to FIG. 5 earlier, the X component (or Y component) outputted from the S/H unit 16 is applied to the addition input point (inversed input terminal) of the operational amplifier 22 via the resistor R1. As a result, the X component (or Y component) is controlled so as to be a fixed value by the function of the feedback control loop. Note that this operational amplifier 22 includes a feedback circuit (PI regulator: Proportional Integral regulator) consisting of a series connection of a resistor R2 and a capacitor C. This is because feedback control in the feedback control loop is performed in a discrete system that is synchronous with a sample pulse, so that an integration function is imparted to the operational amplifier 22 in order to avoid inconvenience of origination or the like.

An angle detection principle according to this embodiment will be outlined concerning the case in which the Hall elements in the X direction are driven such that the X component is fixed.

In general, a voltage Vx, which is outputted from the Hall elements for detecting the X component, and a voltage Vy, which is outputted from the Hall elements for detecting the Y component, are represented by $Vx = k \cdot Ix \cdot B \cos\theta$ and $Vy = k \cdot Iy \cdot B \sin\theta$, respectively. Here, k is a constant of proportionality, Ix and Iy are current values, B is a magnetic flux density, and θ is an angle defined by a magnetic field and a Hall element.

Taking into account the fact that the same drive voltage is supplied to the Hall elements HE(Y) for detecting the Y component and all the Hall elements are fine elements formed on an identical silicon substrate as explained in FIG. 5, it is possible to make Ix and Iy equal.

Therefore, from the above-described two expressions, that is, $Vx = k \cdot Ix \cdot B \cos\theta$ and $Vy = k \cdot Iy \cdot B \sin\theta$, the following expression is obtained.

$$Vy/Vx = (k \cdot Iy \cdot B\sin\theta)/(k \cdot Ix \cdot B\cos\theta)$$

$$= \sin\theta/\cos\theta$$

$$= \tan\theta$$

This analog division (Vy/Vx) only has to be executed in the post-processing circuit 14.

However, according to this embodiment, it becomes possible to directly calculate tan θ from the X component held in the S/H unit 10 or the Y component held in the S/H unit 12, without performing the calculation of applying individual arithmetic processing as described above to calculate sin θ and cos θ and calculating tan θ on the basis of these sin θ and cos θ.

Figure 8:
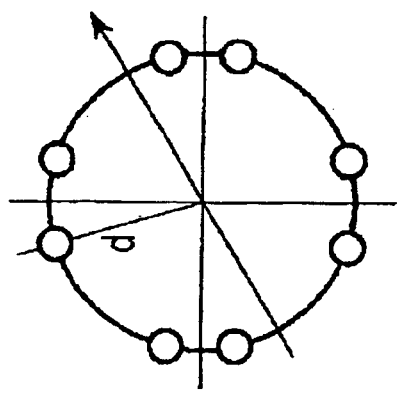
FIG. 8 is an explanatory diagram showing a tan θ detection principle in the case in which eight Hall elements are used.

FIG. 8 is a diagram indicating that the above-described tan θ detection principle can also be applied in the case in which eight Hall elements (see FIG. 2) are used. FIG. 8 shows the case in which four Hall elements are used for the X component and four Hall elements are used for the Y component (total eight Hall elements), for example, in order to improve sensitivity. In the figure, strictly speaking, the Hall elements are not arranged on the X (or Y) axis but are arranged in positions slightly deviating from the X (or Y) axis. A straight line drawn from the center to the center of the Hall element is arranged with a very fine angle d with respect to the axis. For example, as to the Hall elements for the X component, when the elements are arranged at an angle of ±d symmetrically with respect to the X axis, the respective element outputs a signal proportional to cos(θ+d) and cos(θ−d). If these four signal components are added using the DDA 6, a total of Hall element outputs for the X component is calculated as follows:

$$KIB \cdot [\cos(\theta+d)+\cos(\theta-d)]$$

If this output is regulated so as to be a constant voltage $V_{REF}$ using a regulator, the following expression is obtained:

$$V_{REF} = KIB \cdot [\cos(\theta + d) + \cos(\theta - d)]$$
$$= 2KIB\cos\theta\cos d$$

$$2KIB = V_{REF}/(\cos \theta \cos d)$$

On the other hand, as to a Hall element output for the Y component, similarly, the four signal components are added using the DDA 6, the following expression is obtained:

$$KIB \cdot [\sin(\theta + d) + \sin(\theta - d)] = 2KIB\sin\theta\cos d$$
$$= V_{REF}(\sin\theta\cos d)/(\cos\theta\cos d)$$
$$= VREF\tan\theta$$

The very fine angle component d is cancelled if, while keeping a sum of the respective Hall element outputs substantially constant, outputs of the other Hall elements are considered. Hence, the outputs are not affected.

Note that, in this embodiment, the PI regulator 24 is given as an example. However, a regulator is not limited to the PI regulator and other regulators (e.g., a PID regulator) may be used.

Figure 9:
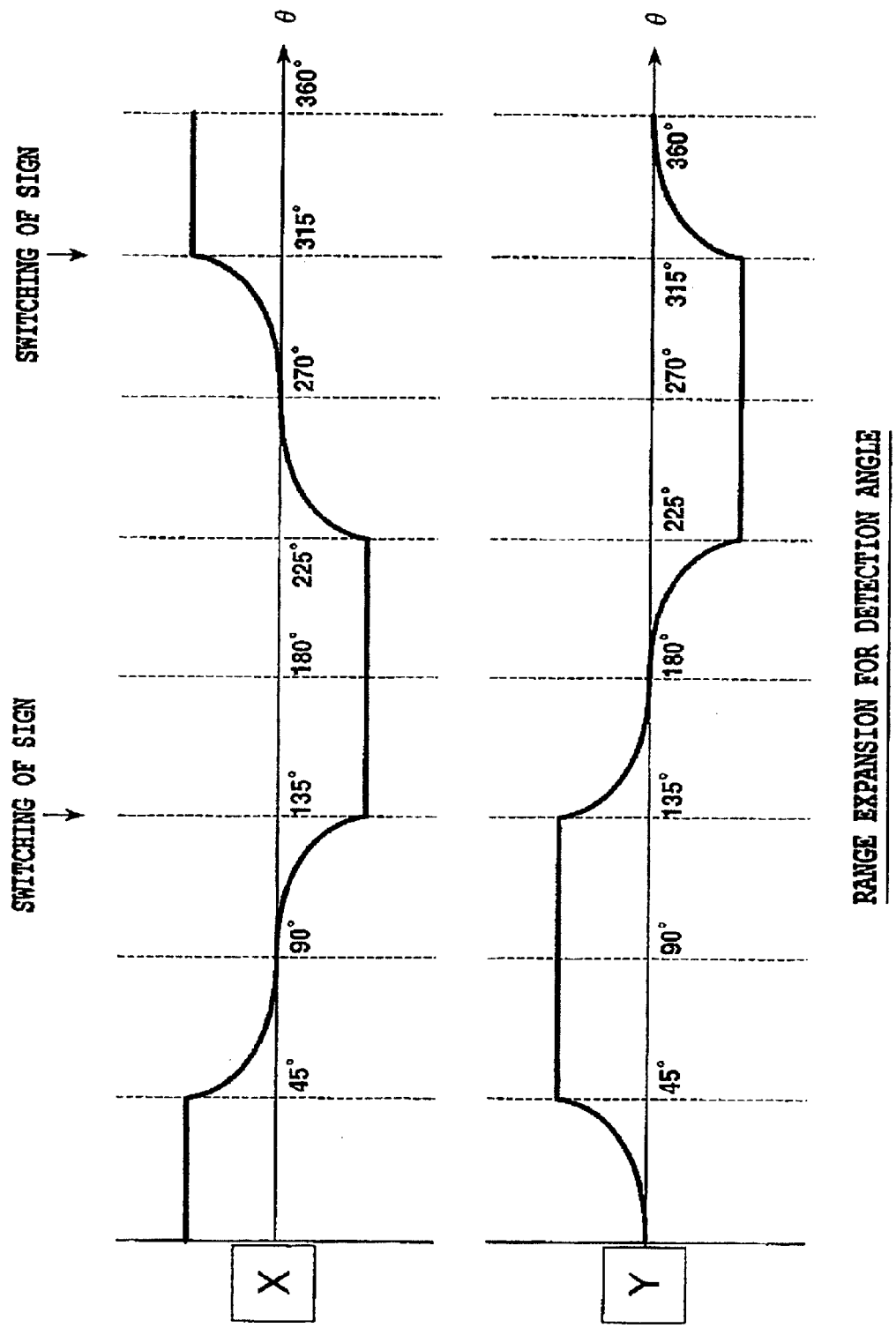
FIG. 9 is a diagram illustrating range expansion processing for a detection angle in this embodiment using Hall elements.

FIG. 9 is a diagram illustrating a range expansion processing for a detection angle by a Hall element. That is, FIG. 9 shows a method of expanding a detection angle range to 360°. By switching a signal, which should be regulated to a constant voltage, from an X component signal to a Y component signal or from a Y component signal to an X component signal, it is possible to switch an output thereof from tan θ to cot θ or vise versa. As it is well known, since tan θ increases as the angle approaches 90°, saturation occurs in an output of an amplifier circuit system. Thus, in order to detect an angle close to 90° while avoiding this problem, it is convenient to use cot θ that is an inverse of tan θ.

Next, the angle detection range expansion method shown in FIG. 9 will be explained in a time series manner.

First, in an angle range of 0 to 45°, tan θ is used as an output for angle detection. When the detection angle increases to reach θ=45°, the output for angle detection is switched from tan θ to cot θ. More specifically, a signal to be regulated is switched from an X component to a Y component. Thereafter, when the angle increases to reach 135°, the output for angle detection is switched from cot θ to tan θ again.

However, a point that should be noted is handling of a sign. When the X component is switched from cot θ to a signal, which should be regulated, without changing a sign, this results in an unstable state because the component changes significantly from $-V_{REF}$ to $+V_{REF}$. In addition, a long time is required until the state is stabilized (i.e., a settling time over a long period is required). In order to avoid such a problem, in this embodiment, a sign of the signal, which should be regulated, is switched. Consequently, stable angle detection can be performed while an unstable transitional state is minimized. The same sign switching processing is performed at a point of 315°.

As described above, in this embodiment, tan and cot signs are switched while a certain judgment condition is used, whereby the angle detection range is expanded. Concerning the tan and cot switching, for example, a magnitude relation of absolute values thereof is judged. In addition, judgment of magnitude relationship of the absolute values and an absolute value of a reference voltage (analog ground AGND) can be used for switching of the signs.

Figure 10:
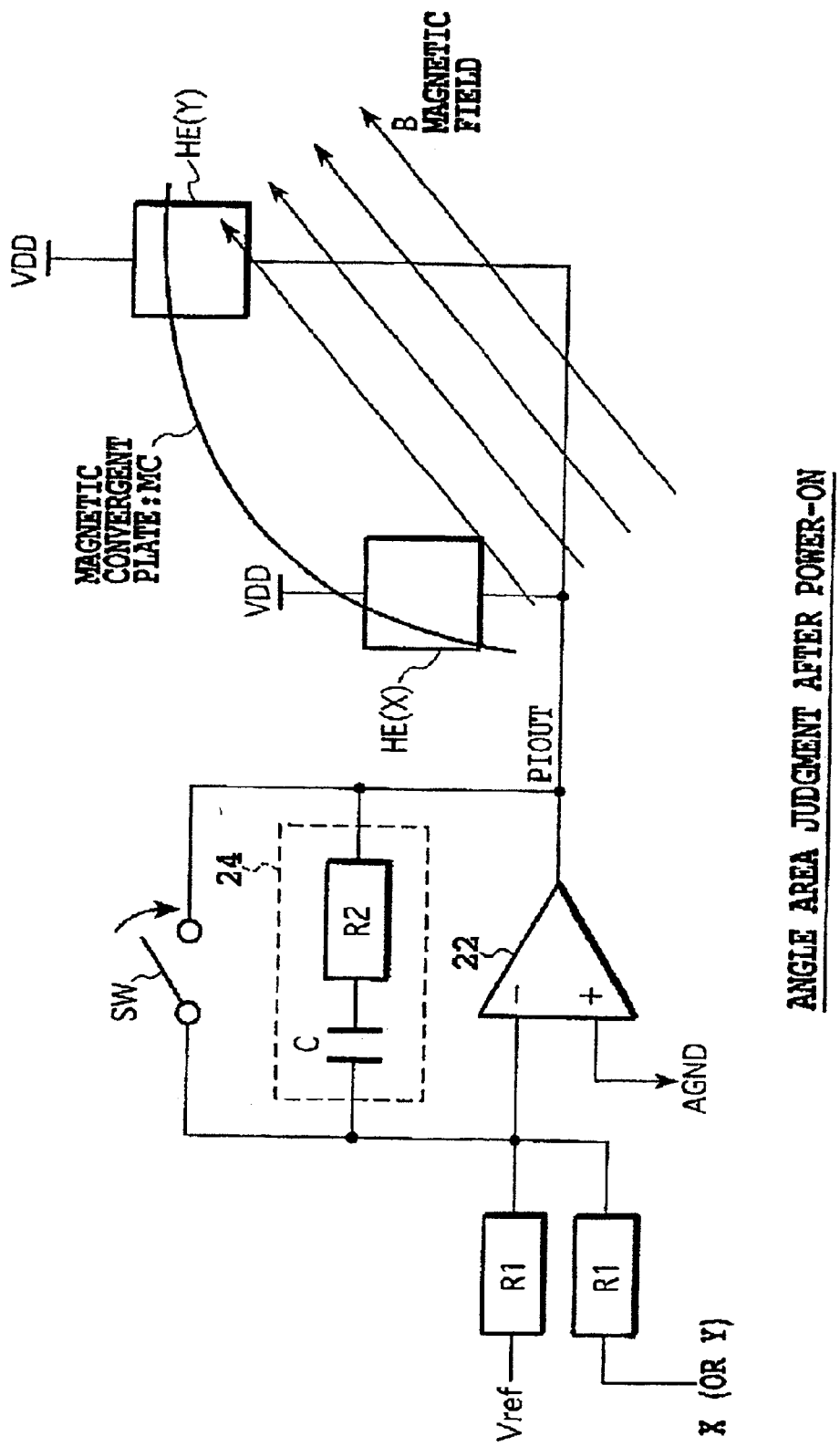

FIG. 10 is a diagram showing a switch SW for performing feedback control cancellation in the case in which angle area judgment is performed after power-on. A circuit shown in the figure is a circuit for obtaining positional information of the angle after power-on. The circuit configuration (FIGS. 1 to 9), which has been explained, is characterized by holding one output component at a fixed value using the PI regulator 24 and expanding an angle range while an angle area is judged. However, the circuit configuration has an inconvenience that the angle area cannot be judged. Thus, the circuit of FIG. 10 compensates for this inconvenience.

In FIG. 10, this circuit and a control circuit therefor are designed such that the switch SW is in a closed state for a certain fixed period after power-on. In this case, the PI regulator 24 serves as a voltage follower that changes the simple AGND (analog ground) to an output voltage. Therefore, Hall elements are driven at the analog ground voltage AGND, and outputs corresponding to sin and cos are obtained with respect to an angle. In this state, the same angle area judgment (absolute value comparison, sign judgment) is performed, a position after power-on is judged, and a sign and a mode (tan, cot) based upon the positional information are determined and loaded to a binary storage such as a flip-flop. Thereafter, the switch SW is opened, and the circuit shifts to a normal PI regulator mode while using this positional information.

Figure 11:
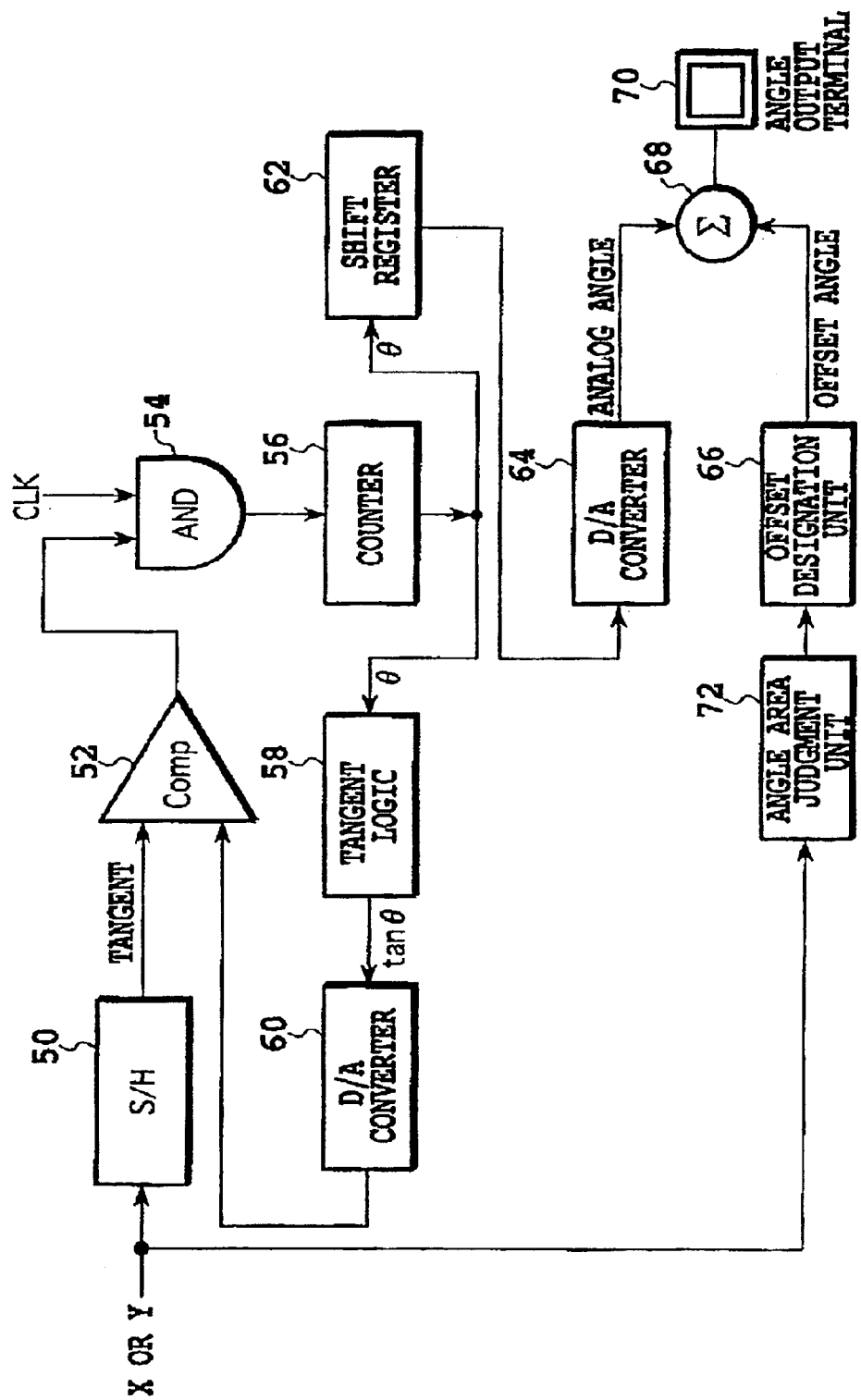
FIG. 11 is a block diagram showing an example of an angle calculation processing circuit included in a post processing circuit 14 shown in FIG. 1.

FIG. 11 is a block diagram showing an example of an angle calculation processing circuit included in the post-processing circuit 14 (see FIG. 1). That is, FIG. 11 is a circuit for obtaining a voltage output corresponding to an angle of a magnetic field from the X component and the Y component obtained by the circuit of FIG. 1. More specifically, since an angle detection result obtained by the circuit shown in FIG. 1 represents tan θ (or cot θ), the circuit of FIG. 11 performs calculation for substantially obtaining an arc tangent.

The operation of the circuit shown in FIG. 11 is as described below.

A tan component signal obtained from the circuit shown in FIG. 1 is sampled and held by the S/H (sample/hold) unit 50 to become an input signal for a comparison circuit 52. An AND gate 54 following the comparison circuit 52 outputs a value of a clock CLK without change when an output signal of the comparison circuit 52 is HIGH (VDD: supply voltage) and outputs "0"θ when the output signal is LOW (GND). Therefore, when the output signal of the comparison circuit 52 is LOW, a counting clock CLK of a counter 56 changes to "0", and the counter 56 stops counting. An analog voltage, which is obtained by inputting a counting output value of the counter 56 to a tangent logic 58 and further passing the counting output value through a D/A converter 60, is inputted to the other input terminal of the comparison circuit 52. The tangent logic 58 functions as a circuit in which a digital output of the counter 56 is inputted to generate a digital value corresponding to tan θ. This is performed by a logic circuit, not specifically limited thereto, but may be performed in a table reference method using a nonvolatile memory (EEPROM, FRAM, MRAM).

Feedback of the counter 56, the tangent logic 58, and the D/A converter 60 is repeated until a magnitude relation of both the inputs of the comparison circuit 52 is reversed. When the magnitudes of both the inputs coincide with each other or are reversed, the clock input CLK to the counter 56 is stopped, and the counter 56 stops counting. That is, a digital output value of the counter 56 represents the angle θ and an output from the D/A converter 60 represents tan θ. The digital output value of the counter 56, at the time when the digital output value coincides with or is closest to a tan value supplied from the circuit of FIG. 1 and held in the S/H circuit 50, represents the angle θ itself. Thus, this digital output value is loaded to a shift register 62 and transformed into an analog value in a D/A converter 64, whereby an analog voltage corresponding to the angle θ can be obtained.

In addition, as another embodiment, a digital output value may be outputted by a serial interface without using the D/A converter 64. Examples of the serial interface include an SPI, a micro-wire, and an I2C bus.

However, angle information to be obtained is insufficient only with this transformation due to a characteristic of angle judgment shown in FIG. 9. For example, this is because the same analog output voltage is obtained at 22.5° and 157.5°. In order to avoid this problem, it is necessary to add an offset voltage according to an angle area. More specifically, if offset voltages are added by changing the offset voltages for each quadrant, for example, such that an offset voltage is 0V in a first quadrant and 2.5V in a third quadrant, complete angle judgment becomes possible. Judgment of a quadrant can be determined uniquely by, for example, dividing an angle area of 0 to 360° into eight areas for every 45° and judging a sign of X, an exclusive OR of signs of X and Y (judgment of coincidence and non-coincidence), and a magnitude of an absolute value (tan or cot) in each area.

If an offset voltage outputted from an offset designation unit 66 is added to an analog voltage corresponding to the angle θ outputted from the D/A converter 64 as shown in FIG. 11, a complete angle output is obtained. The offset designation unit 66 is constituted by, for example, a D/A converter. In addition, if the number of bits of the D/A converter 64 is expanded and a digital output from an angle area judgment unit 72 is inputted and added to the D/A converter 64, a complete angle output is obtained as an output of the D/A converter 64, dispensing the need to provide the offset designation unit 66 and an adder 68.

Figure 12:
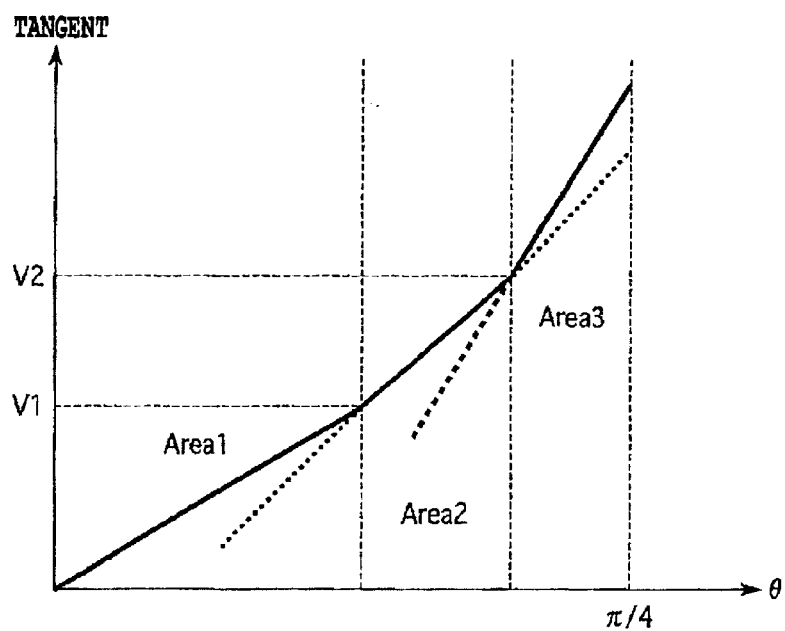
FIG. 12 is a diagram showing an output curve of tangent in an angle range of 0 to 45°.
Figure 13A:
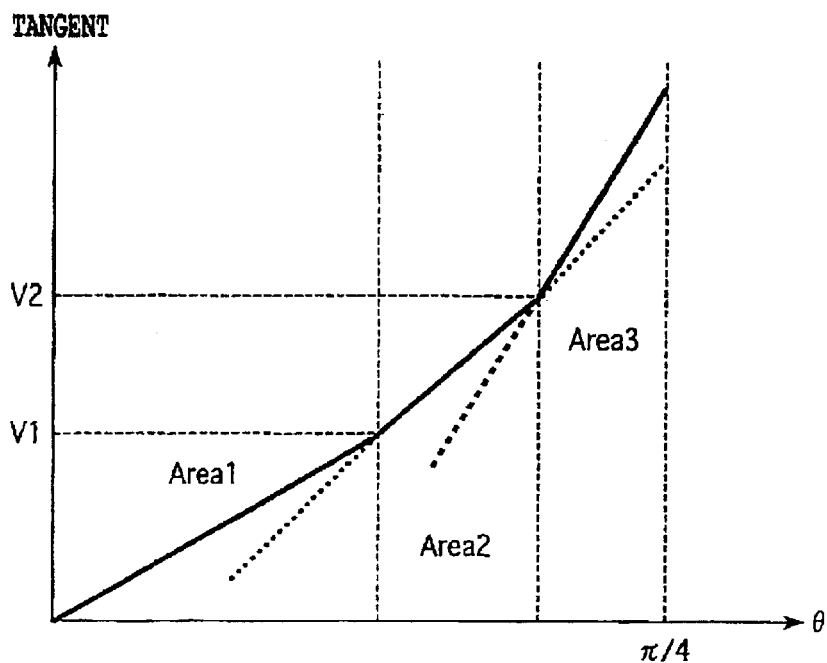
FIG. 13A is an explanatory diagram of a linear transformation processing in this embodiment.
Figure 13B:
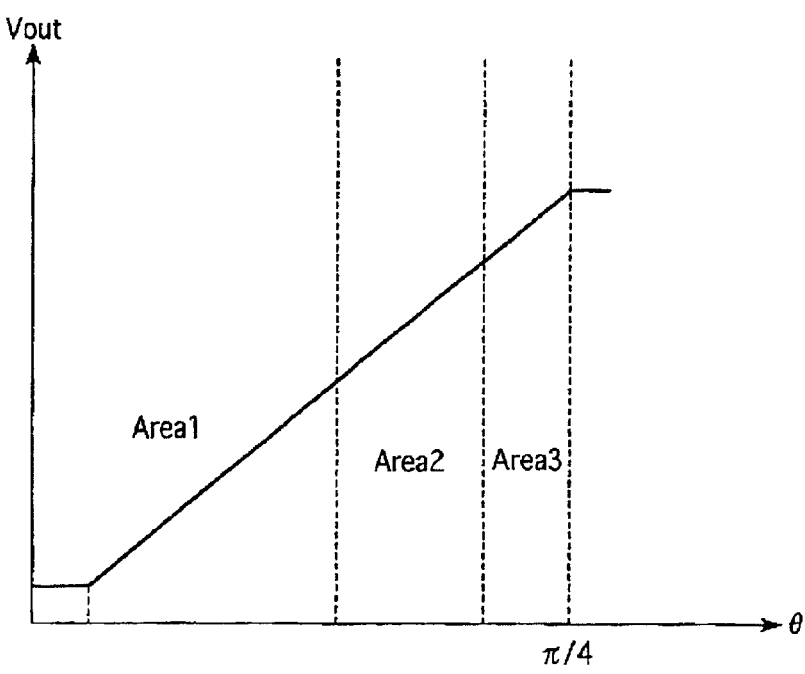
FIG. 13B is an explanatory diagram of the linear transformation processing in this embodiment.

FIG. 12 shows an output curve of the tangent in an angle range of 0°to 45°. It was found that, if this tangent curve is divided into three areas as shown in FIG. 12 and approximated linearly, extremely accurate approximation can be performed. The tangent curve approximated linearly is described by three linear equations. In this case, transformation from FIG. 13A to FIG. 13B can be realized by linear transformation from a straight line to a straight line rather than nonlinear functional transformation like an arc tangent.

For example, in a tangent approximate straight line, when it is assumed that an equation of a straight line in Area 2 is tangent=A·θ+B and an equation of an angle voltage straight line is C·θ+D, if an inclination A of a tangent output and a section (offset) B are adjusted in an analog manner to match C and D, this is equivalent to performing an arc tangent transformation.

More specifically, the transformation of an inclination from A to C is feasible by making an amplification factor of a negative feedback amplification circuit variable. This is also feasible by a programmable amplification circuit using a nonvolatile memory and is also possible by trimming with an externally attached resistor. In addition, a variable potentiometer using a resistance ladder can be used for the adjustment of a section from B to D.

In addition, for the judgment of an area in the linear approximation of tangent, it is effective to use a generation circuit for generating a reference voltage together with the comparison circuit. More specifically, in FIG. 13A, a circuit for generating reference voltages V1 and V2 is provided, and these reference voltages and a tangent output are compared. For example, by using two comparison circuits, codes as described below can be generated.

Tangent output≦V1 Code (0:0)
(Output of the comparison circuit 1: Output of the comparison circuit 2)
V1≦Tangent output≦V2 Code (0:1)
Tangent output≧V2 Code (1:1)

An area can be defined uniquely by the above-described codes.

It is possible to use the method described in FIG. 9 for expansion of an angle area. In an area of cotangent, an area of 45° is divided into tree areas in the same manner to perform linear transformation. In this case, since an inclination of a straight line is negative, an inversing amplification circuit is used to inverse the inclination of the straight line. The adjustment of a section can be realized by a variable potentiometer. If an offset voltage equivalent to an angle area is added to this straight line, it is theoretically possible to expand an angle range to 360°. However, from the viewpoint of reduction of a circuit size and simplification of a correction algorithm, this method is more preferable for an application with a small angle range (e.g., 0° to 90°).

Figure 14:
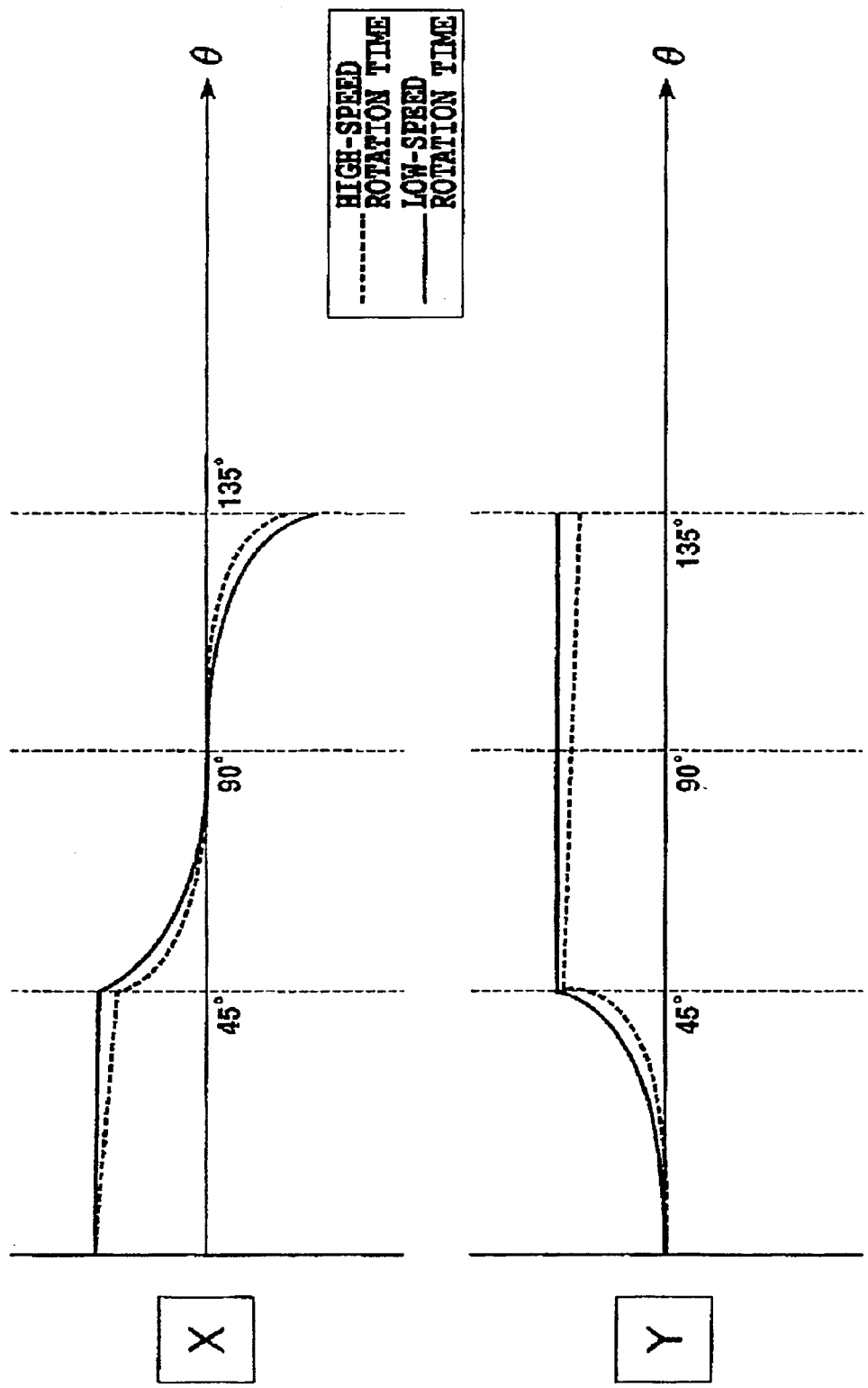
FIG. 14 is an explanatory diagram showing a state in the case in which a voltage, which should be regulated, does not become a constant voltage due to delay in feedback control.

FIG. 14 is an explanatory diagram showing a state in which a voltage, which should be regulated, does not become a constant voltage due to delay in feedback control. That is, in the case in which a voltage, which should be regulated, does not reach a fixed level (a feedback speed is not high enough), it is possible that a gain of tangent changes by an amount of the voltage fluctuation. Thus, in order to solve inconvenience due to such a state, other embodiments will be explained with reference to FIGS. 15A and 15B.

Figure 15A:
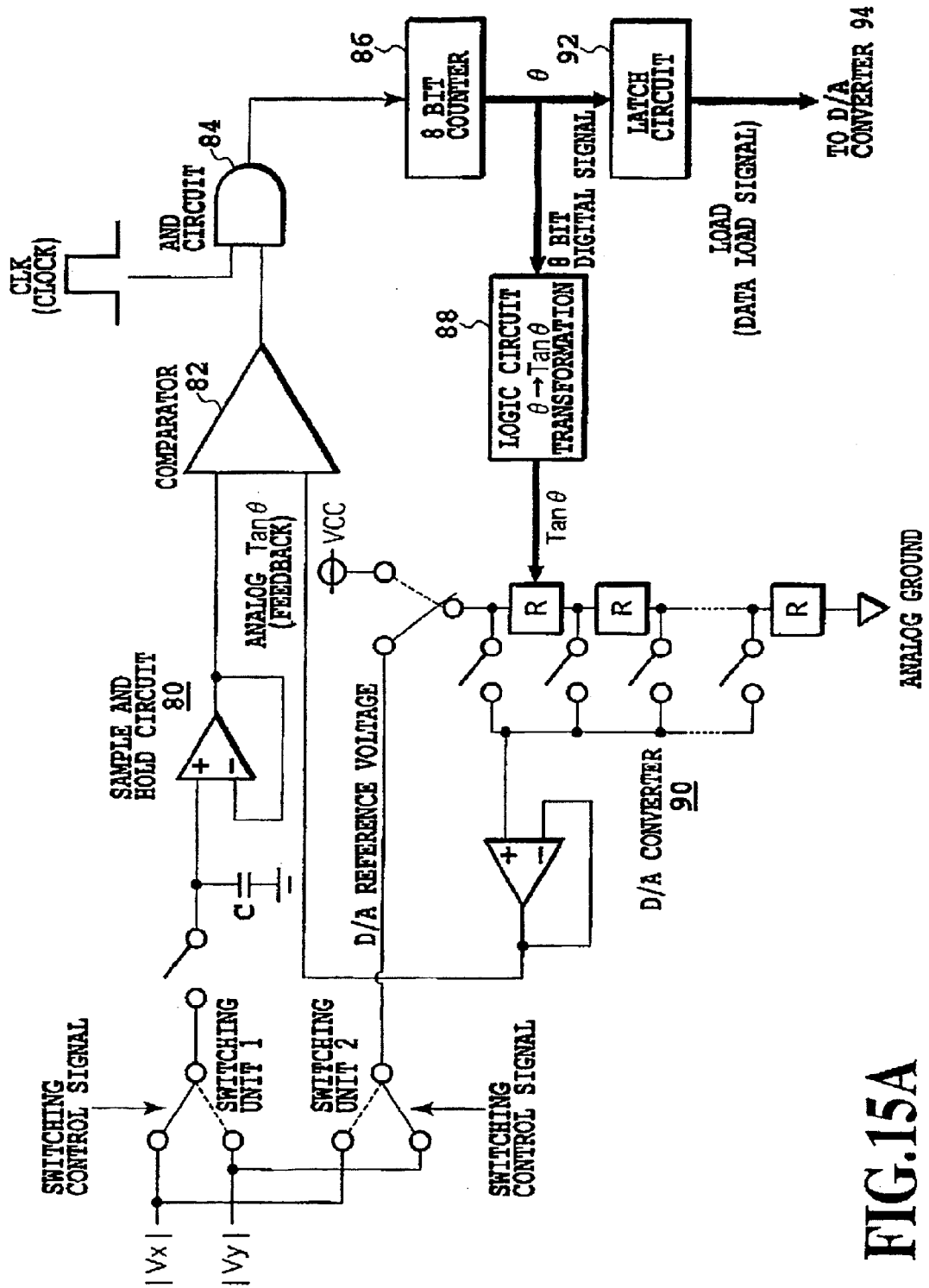
FIG. 15A is a circuit diagram showing another embodiment for avoiding the state in which a voltage, which should be regulated, does not become a constant voltage.
Figure 15B:
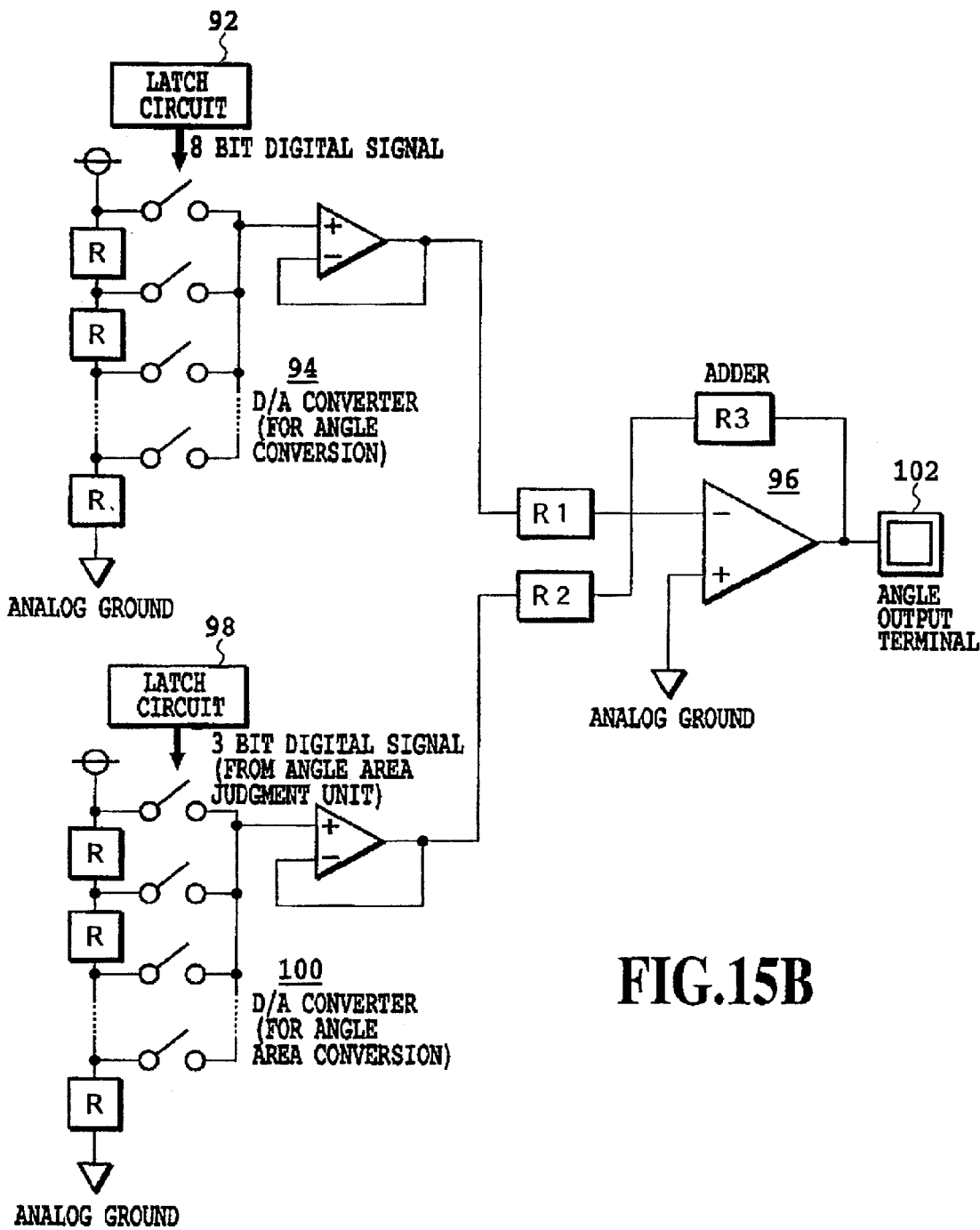
FIG. 15B is a circuit diagram showing another embodiment for avoiding the state in which a voltage, which should be regulated, does not become a constant voltage.

FIGS. 15A and 15B are circuit diagrams showing other embodiments for avoiding the state in which a voltage, which should be regulated, does not become a constant voltage. These circuits shown in both the diagrams illustrate the circuit of FIG. 11, which was explained earlier, more specifically and improvements are made as described below.

In FIG. 15A, absolute value signals of |X| or |Y| signals are inputted from an analog front end. A switching unit 1 functions to switch a signal to be inputted to a sample and hold circuit 80 to |X| or |Y|. An output of the sample and hold circuit 80 is inputted to one input terminal of a comparator 82. An output signal of the comparator 82 is inputted to an AND circuit 84 of a two-input type. The other input signal of the AND circuit 84 is a clock, which functions to output a clock signal until the output signal of the comparator 82 is switched to a LOW level.

An eight-bit counter 86 counts clocks outputted from the AND circuit 84. An output of the eight-bit counter 86 (eight-bit digital signal) is inputted to a logic circuit 88. The logic circuit 88 is a logic circuit that is inputted with output data of the eight-bit counter 86 and generates a digital output obtained by weighting the input with a tan function. In other words, when a counter output is assumed to be θ, an output from the logic circuit 88 is tan θ.

This digital data tan θ is inputted to a D/A converter 90 of a resistance ladder type and fed back to the other input terminal of the comparator 82. The comparator 82 compares an absolute value of |X| or |Y| to be inputted to the sample and hold circuit 80 (tangent or cotangent) with tan θ that is fed back and returned, and when a magnitude relation thereof is reversed, switches a comparator output from HIGH to LOW and stops clock counting of the eight-bit counter 86.

In other words, the comparator 82 stops the counting clock of the eight-bit counter 86 with a voltage value closest to the |X| or |Y| signal inputted to the sample and hold circuit 80. Therefore, a digital value before weighting the input with tangent in the logic circuit 88, that is, a digital value itself of the angle θ becomes an output of the eight-bit counter 86. A digital value representing this angle θ is transferred to a latch circuit 92 with an appropriate data load signal and inputted to a D/A converter 94 in a subsequent stage thereof (see FIG. 15B).

In addition, the switching unit 2 functions to switch a reference voltage of the D/A converter 90 to the |X| or |Y| signal. Switching according to a switching control signal of the switching unit 1 and the switching unit 2 is performed as described below.

That is, in the analog front end, one of |X| and |Y| is regulated to a constant voltage, and tangent or cotangent is obtained from the other. A signal is selected such that a tangent or cotangent signal is inputted to the sample and hold circuit 80 and the regulated voltage is inputted to the reference voltage of the D/A converter 90. For example, when |X| is regulated, tan θ is obtained from |Y|. In this case, |Y| is inputted to the sample and hold circuit 80, and |X| is inputted as the D/A converter reference voltage.

Next, an effect in the case in which a regulated signal is used as the reference voltage of the D/A converter 90 in this way will be explained. In the analog front end, the PI regulator is used to control a feedback loop of a discrete system as already explained in FIG. 1. In the case in which a magnetic field rotates at a high speed, an influence of delay due to an integrated time of the PI regulator appears conspicuously. More specifically, as shown in FIG. 14, a phenomenon occurs in which a signal, which should originally be regulated to a fixed value, cannot be held at a fixed level and a voltage falls. A magnitude of this voltage drop depends upon a rotation speed, and highly accurate angle detection is impossible in this state. This point will be hereinafter explained more in detail using formulas.

Now, in the case in which a voltage, which should be regulated, is not kept constant but changes as time elapses, a reference voltage therefor is assumed to be $V_{REF}(t)$. In this case, in the case in which an |X| signal is regulated, the following relational expressions are established.

$V_{REF}(t) = K \cdot I \cdot B \cdot \cos θ$ $|Y| = K \cdot I \cdot B \cdot \sin θ$ From these relations, $|Y| = V_{REF}(t) \cdot \tan θ$ is obtained.

That is, tan θ obtained from |Y| has a gain factor that changes as time elapses. When this value is directly subjected to angle transformation, an angle error, which changes as time elapses, is caused. In order to avoid this problem, in this embodiment, $V_{REF}(t)$ is used as the reference voltage of the D/A converter 90. With such a constitution, the analog signal tan θ, which is fed back from the D/A converter 90 and inputted to the comparator 82, has weight of $V_{REF}(t)$. An influence by $V_{REF}(t)$ is not exerted on a point where a magnitude relation of the comparator 82 is reversed, that is, a digital value corresponding to an angle.

Note that, as described above, although an absolute value signal of |X| or |Y| is inputted from the analog front end, it is also possible to input a signal of X or Y, which is not an absolute value, without change.

In this manner, by using a voltage with its level fluctuated by high-speed rotation as the reference voltage of the D/A converter 90, since a gain factor is cancelled automatically, so that highly accurate angle detection becomes possible even at the time when a magnetic field rotates at a high speed.

Figure 16A:
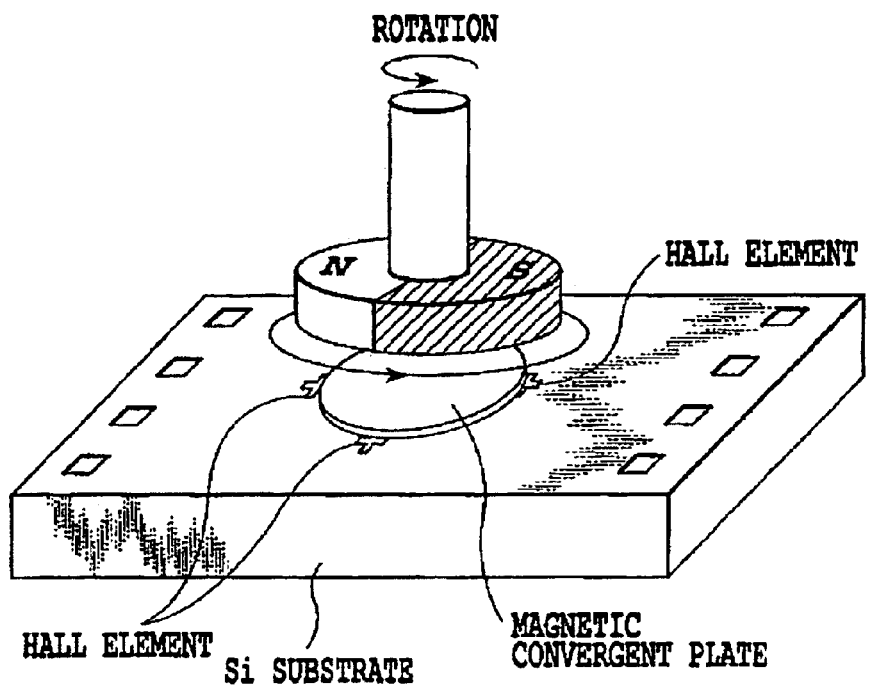
FIG. 16A is a perspective view showing an example of a core in an angle detection unit to which the present invention is applied.
Figure 16B:
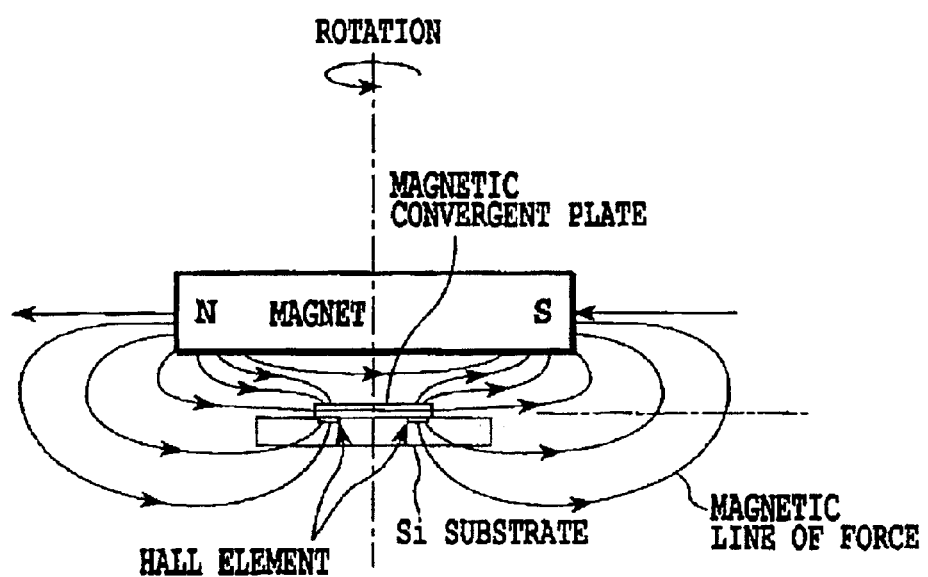
FIG. 16B is a sectional view showing the example of the core in the angle detection unit to which the present invention is applied.

FIGS. 16A and 16B show an example of a core in an angle detection unit to which the present invention is applied. In the figure, a disk (magnetic flux concentrator) consisting of a circular magnetic material is adhered on Hall elements that are formed on a Si substrate together with a signal processing circuit. Here, FIG. 16A shows a state of this core and FIG. 16A also shows a preferred shape of a magnet of this core. In addition, FIG. 16B schematically shows a distribution of magnetic lines of force at that point. Magnetic lines of force in a lateral direction inputted from the right are converged by the magnetic flux concentrator and amplified, and at the same time, transformed into a magnetic field in a vertical direction. A direction of this magnetic field is opposite between a Hall element on the S side and a Hall element on the N side. When an input signal is supplied to a DDA, attention should be paid so that a polarity is reversed. In one example, it is possible to obtain an amplification factor about twice as large with a magnetic flux concentrator of 200 micron φ.

As explained above, according to the present invention, an angle detection apparatus and a semiconductor device, which permit to make accurate angle detection, regardless of a simple circuit configuration, can be realized. In particular, even in the case in which a magnetic field rotates at a high speed, accurate angle detection, which cannot be expected in a conventional apparatus, can be performed. Moreover, with respect to fluctuation in a magnetic field involved in an increase of an ambient temperature, according to the present invention, an angle detection apparatus and a semiconductor device, which permit to make accurate angle detection, can be realized.

What is claimed is:

1. An angle detection apparatus producing an angle signal representative of a relative angle between the angle detection apparatus and a magnetic field source that is rotatable on a rotation axis and produces a magnetic field, the angle detection apparatus comprising first and second magnetic sensor units for detecting first and second magnetic components of the magnetic field of the magnetic field source, the first and second components oriented orthogonally to each other and lying in a plane running orthogonally to the axis of rotation of the magnetic field source, driving means for driving the first and second magnetetic sensor units, and control means coupled to the driving means, wherein in a first mode of operation the control means control an output signal of the first magnetic sensor unit so as to have a fixed value and the driving means drive the second magnetic sensor unit according to the same drive conditions as those applied to the first magnetic sensor unit at the time when the first magnetic sensor unit is controlled by said control means, so that an output signal of the second magnetic sensor unit is proportional to the tangent of said relative angle.

2. The angle detection apparatus of claim 1, wherein in a second mode of operation the control means control the output signal of the second magnetic sensor unit so as to have a fixed value and the driving means drive the first magnetic sensor unit according to the same drive conditions as those applied to the second magnetic sensor unit at the time when the second magnetic sensor unit is controlled by said control means, so that an output signal of the first magnetic sensor unit is proportional to the cotangent of said relative angle.

3. The angle detection apparatus of claim 2, further comprising means for disabling the control means in a third mode of operation, so that neither the output signal of the first magnetic sensor unit nor the output signal of the second magnetic sensor unit is controlled so as to have a fixed value, area judging means for determining from the output signal of the first magnetic sensor unit and the output signal of the second magnetic sensor unit an angle area in which said relative angle lies, and means for enabling the control means and selecting a mode of operation from the first or second mode of operation according to the determined angle area.

4. The angle detection apparatus of claim 1, further comprising means for calculating said relative angle, the means for calculating comprising counting means for performing a counting operation, an output of the counting means representing a value θ, transforming means for transforming the value θ of the output of the counter into tangent θ, and a comparator, the comparator having a first input to which in the first mode of operation of the angle detection apparatus the output of the second magnetic sensor unit is fed and a second input to which an output of the transforming means is fed, wherein an output of the comparator controls the counting operation and wherein at the end of the counting operation the output value θ of the counting means represents said relative angle.

5. The angle detection apparatus of claim 2, further comprising means for calculating said relative angle, the means for calculating comprising counting means for performing a counting operation, an output of the counting means representing a value θ, transforming means for transforming the value θ of the output of the counter into tangent θ, and a comparator, wherein in the first mode of operation the output of the second magnetic sensor unit is fed to a first input of the comparator and an output of the transforming means representing tangent θ is fed to a second input of the comparator, wherein in the second mode of operation the output of the first magnetic sensor unit is fed to the first input of the comparator and the output of the transforming means representing tangent θ is fed to the second input of the comparator, and wherein an output of the comparator controls the counting operation and wherein at the end of the counting operation said relative angle is determined from the output value θ of the counting means.

6. The angle detection apparatus of claim 3, further comprising means for calculating said relative angle, comprising counting means for performing a counting operation, an output of the counting means representing a value θ, transforming means for transforming the value θ of the output of the counter into tangent θ, and a comparator, wherein in the first mode of operation the output of the second magnetic sensor unit is fed to a first input of the comparator and an output of the transforming means representing tangent θ is fed to a second input of the comparator, wherein in the second mode of operation the output of the first magnetic sensor unit is fed to the first input of the comparator and the output of the transforming means representing tangent θ is fed to the second input of the comparator, and wherein an output of the comparator controls the counting operation and wherein at the end of the counting operation said relative angle is determined from the output value θ of the counting means.

7. The angle detection apparatus of claim 1, further comprising a magnetic flux concentrator with a flat shape, wherein the first and second magnetic sensor unit each comprises at least one Hall element arranged near a periphery of the magnetic flux concentrator.

8. The angle detection apparatus of claim 2, further comprising a magnetic flux concentrator with a flat shape, wherein the first and second magnetic sensor unit each comprises at least one Hall element arranged near a periphery of the magnetic flux concentrator.

9. The angle detection apparatus of claim 3, further comprising a magnetic flux concentrator with a flat shape, wherein the first and second magnetic sensor unit each comprises at least one Hall element arranged near a periphery of the magnetic flux concentrator.

10. The angle detection apparatus of claim 4, further comprising a magnetic flux concentrator with a flat shape, wherein the first and second magnetic sensor unit each comprises at least one Hall element arranged near a periphery of the magnetic flux concentrator.

11. The angle detection apparatus of claim 5, further comprising a magnetic flux concentrator with a flat shape, wherein the first and second magnetic sensor unit each comprises at least one Hall element arranged near a periphery of the magnetic flux concentrator.

12. The angle detection apparatus of claim 6, further comprising a magnetic flux concentrator with a flat shape, wherein the first and second magnetic sensor unit each comprises at least one Hall element arranged near a periphery of the magnetic flux concentrator.

* * * * *

UNITED STATES PATENT AND TRADEMARK OFFICE
CERTIFICATE OF CORRECTION

PATENT NO.        : 6,969,988 B2
APPLICATION NO. : 10/508847
DATED              : November 29, 2005
INVENTOR(S)      : Katsumi Kakuta et al.

It is certified that error appears in the above-identified patent and that said Letters Patent is hereby corrected as shown below:

Column 14, line 50, the word "magnetetic" should read as --magnetic--.

Signed and Sealed this

Twentieth Day of March, 2007

JON W. DUDAS
*Director of the United States Patent and Trademark Office*